United States Patent
Losey et al.

(10) Patent No.: US 6,380,643 B1
(45) Date of Patent: Apr. 30, 2002

(54) INTEGRATED ANTENNA FOR USE WITH PASSIVE ENTRY AND IGNITION SYSTEM

(75) Inventors: Allan D. Losey, Ortonville; Tejas B. Desai, Sterling Hghts.; Susan Johnson, Rochester, all of MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/709,846

(22) Filed: Nov. 10, 2000

Related U.S. Application Data
(60) Provisional application No. 60/166,398, filed on Nov. 18, 1999, and provisional application No. 60/166,397, filed on Nov. 18, 1999.

(51) Int. Cl.⁷ .............................................. B60R 25/00
(52) U.S. Cl. ...................... 307/10.5; 340/667; 343/713; 180/273
(58) Field of Search .............................. 307/10.1, 10.5; 343/713; 180/273; 340/667

(56) References Cited

U.S. PATENT DOCUMENTS

| | | | | |
|---|---|---|---|---|
| 4,688,036 A | * | 8/1987 | Hirano et al. | 340/825.69 |
| 4,755,823 A | * | 7/1988 | Ohe et al. | 343/713 |
| 4,873,530 A | * | 10/1989 | Takeuchi et al. | 343/713 |
| 4,973,958 A | * | 11/1990 | Hirano et al. | 307/10.2 |
| 5,134,392 A | * | 7/1992 | Takeuchi et al. | 340/825.69 |
| 5,515,036 A | * | 5/1996 | Waraksa et al. | 340/825.72 |
| 5,532,709 A | * | 7/1996 | Talty | 343/713 |
| 5,561,430 A | * | 10/1996 | Knebelkamp | 342/44 |
| 5,596,234 A | * | 1/1997 | Umeda et al. | 307/10.2 |
| 5,710,548 A | * | 1/1998 | LeMense | 340/825.69 |
| 5,723,912 A | * | 3/1998 | Ahrabian et al. | 307/10.5 |
| 5,751,073 A | * | 5/1998 | Ross | 307/10.5 |
| 5,900,841 A | * | 5/1999 | Hirata et al. | 343/713 |
| 5,907,287 A | * | 5/1999 | Sakagami et al. | 307/10.1 |
| 5,912,631 A | * | 6/1999 | Kusunoki | 307/10.2 |
| 5,973,611 A | * | 10/1999 | Kulha et al. | 307/10.1 |
| 6,043,752 A | * | 3/2000 | Hisada et al. | 340/825.31 |
| 6,087,996 A | * | 7/2000 | Dery | 343/713 |
| 6,118,410 A | * | 9/2000 | Nagy | 343/713 |
| 6,208,305 B1 | * | 3/2001 | KIng | 343/713 |
| 6,211,831 B1 | * | 4/2001 | Nagy et al. | 343/713 |

FOREIGN PATENT DOCUMENTS

| | | | | |
|---|---|---|---|---|
| WO | WO-99/65736 | * | 12/1999 | B60R/16/02 |

* cited by examiner

*Primary Examiner*—Fritz Fleming

(57) ABSTRACT

An alternative arrangement for a passive entry and ignition system for a vehicle is disclosed. The passive system uses an electronically coded card or 'smart card' that electronically conveys identifying information to a single on board antenna. The single on board antenna is integrated into the roof panel of the vehicle using conventional wire or flat cable technology. The single antenna communicates to a vehicle control unit to enable actuation of various predetermined mechanical systems of a vehicle such as the vehicle entry system or the vehicle ignition system. In an alternative embodiment, the single on board antenna is integrated in an existing occupant detection mat located in the passenger seat of the vehicle.

1 Claim, 1 Drawing Sheet

INTEGRATED ANTENNA FOR USE WITH PASSIVE ENTRY AND IGNITION SYSTEM

This application claims priority to Provisional Application Serial No. 60/166,398, filed Nov. 18, 1999, and entitled "Occupant Detection Mat Integrated Antenna" and Provisional Application Serial No. 60/166,397, also filed Nov. 18, 1999, and entitled "Roof Panel Integrated Antenna."

BACKGROUND OF THE INVENTION

This invention relates to an alternative antenna arrangement for a passive entry and ignition system for a vehicle. The system uses an electronically coded card or 'smart card' that electronically conveys identifying information to an on board antenna system. The on board antenna system, in turn, then communicates to a vehicle control unit to enable actuation of various predetermined mechanical systems of a vehicle such as the vehicle entry system or the vehicle ignition system.

Typically, such passive entry systems involve the use of at least two and up to three interiorly placed antennas for electronically receiving identifying information from an externally located smart card and communicating to the vehicle control unit. Generally, the several antennas are necessary to cover all of the possible area where the card may be carried. Often, this arrangement includes a large antenna system positioned within the vehicle. This system requires a plurality of electrical components and thus, a plurality of switching relays to occur in order to positively respond to the coded information on the smart card provided by the vehicle user at a point adjacent to, yet external from, the vehicle.

It would be desirable to provide a passive entry system for a vehicle that utilizes a simplified antenna arrangement thus requiring fewer electrical components for scanning and receiving electronic information from a smart card, while at the same time covers a larger, yet more clearly defined, scanning area of the vehicle allowing information to be recited either adjacent to or directly within the vehicle.

SUMMARY OF THE INVENTION

In a disclosed embodiment of this invention, a passive entry system for a vehicle is provided with a single antenna to scan the vehicle's interior as well as an external area adjacent to the vehicle for identifying information which is carried by the vehicle user on an electronically coded smart card.

The antenna is integrated into a previously existing element of the vehicle's interior such as the roof panel using conventional wire or flat cable technology. A single antenna integrated in the roof panel covers a significant and clearly defined overhead area in which electronic identifying information may be detected.

In another embodiment, a single antenna may be integrated into a previously existing occupant detection mat, thus providing a significant and clearly defined underbody area in which electronic identifying information may be detected. The integration of the antenna into the existing electronic detection mat reduces the number of separate electronic components which must be designed and incorporated into the vehicle. This is a very inexpensive location for the antenna.

These and other features of the present invention can be understood from the following specification and drawings, the following of which is a brief description.

DETAILED DESCRIPTION OF THE DRAWINGS

Figure 1:
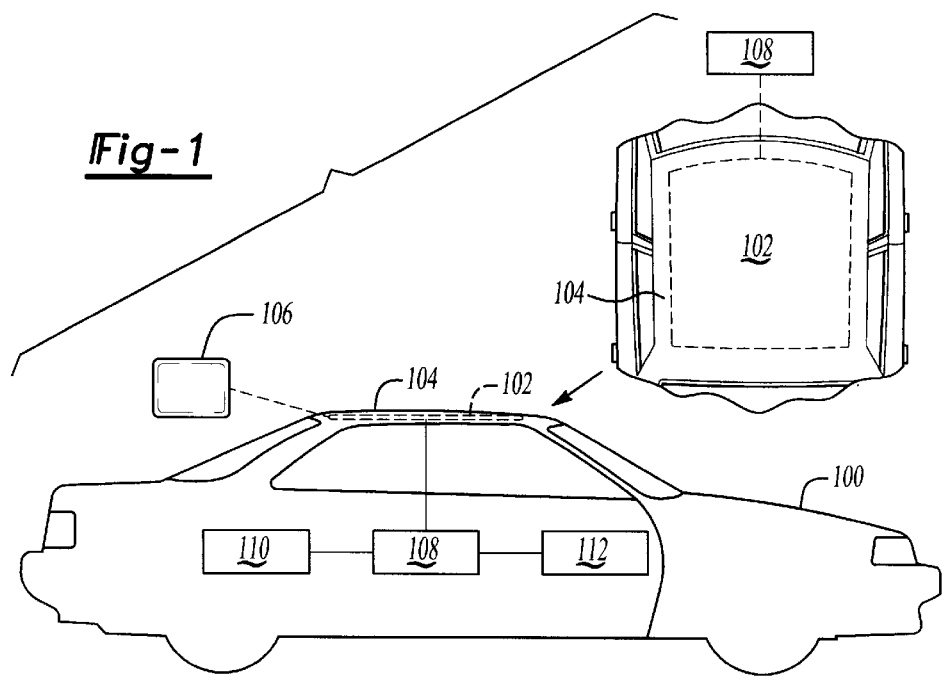
FIG. 1 is a schematic view of the single antenna passive entry and ignition system of the present invention.

FIG. 1 schematically shows a vehicle 100 having a passive entry and ignition system including a single interiorly placed antenna 102 positioned such that it is integrated with the roof panel 104 of vehicle 100 using conventional wire or flat cable technology. Antenna 102 scans the interior of vehicle 100 and extends to a region external and adjacent to vehicle 100 for electronic identifying information. Electronic identifying information is conveyed by an electronically coded smart card 106, which is carried by the vehicle user. The antenna must be able to search both inside the vehicle cab and also outside the adjacent the vehicle. Once identification has been established, antenna 102 electronically communicates to a vehicle control unit 108 which, in turn, enables the actuation of predetermined mechanical systems such as the vehicle entry system 110 and the vehicle ignition system 112.

The passive entry and ignition system operates as follows: The vehicle user carries the smart card 106 with electronic identifying information towards the vehicle 100, perhaps in a pocket or purse. As the vehicle user approaches the scanning area that extends to the region exterior to and adjacent to the vehicle 100, antenna 102 remotely receives identifying data from smart card 106 and sends an electronic signal to vehicle control unit 108. Vehicle control unit 108 then sends an electronic signal that allows actuation of mechanical vehicle entry system 110 and/or vehicle ignition system 112. This system allows the vehicle user to simply approach the vehicle 100 and find it in an unlocked state. Once inside, the vehicle user may find the vehicle 100 ready for start up which may require operating a push button, or other type of keyless ignition device using a simple single interiorly placed antenna 102.

Figure 2:
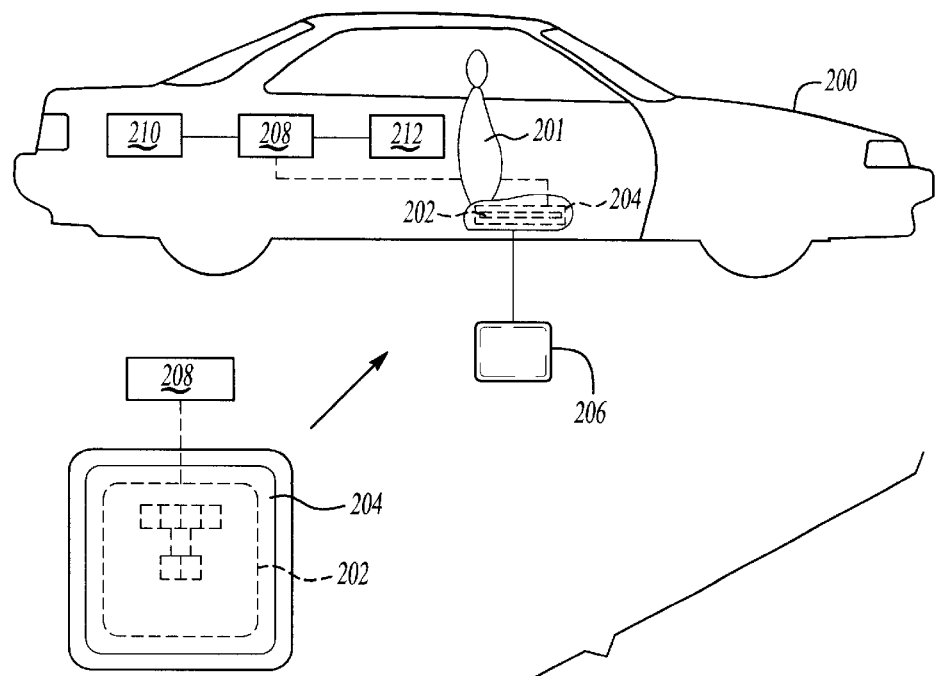
FIG. 2 is a schematic view of an alternative embodiment of the single antenna passive entry and ignition system of the present invention.

With reference to FIG. 2, vehicle 200 is schematically shown having a passive entry and ignition system with an alternatively placed single antenna. In this embodiment, passenger seat 201 is equipped with an electronic detection mat 204 for determining the weight and position of a passenger in order to optimize airbag function. As is clear, and as is known, a seat will typically have a seat back and a seat bottom. The seat bottom is what includes the detection mat, again as is known in the prior art. This electronic component may be as known, and forms no portion of this invention. A single antenna 202 is integrated with this existing electronic detection mat 204 using conventional wire or flat cable technology. As in the case of the roof panel integrated antenna of FIG. 1, antenna 202 scans the vehicle interior and extends to a region external and adjacent to the vehicle 200 for electronic identifying information from a user carried electronically coded smart card 206. Once positive identification has been established, antenna 202 electronically communicates with vehicle control unit 208, which, in turn, enables the actuation of vehicle entry system 210 and vehicle ignition system 212. Thus, the alternative antenna arrangement as described with respect to FIG. 2 allows the vehicle user passive, keyless access to the vehicle entry system and the vehicle ignition system.

This embodiment is particularly useful in that the electronic components which provide the detection mat 204 can be manufactured with the antenna 202. As is known, the building of electronic components is a relatively time-consuming and expensive function. Building both components with a single part thus reduces the cost and complexity of the assembly.

The details of the electronic detection may be as known. Such mats are known for identifying the weight of an occupant in a passenger seat to determine how an airbag may be best controlled.

The two embodiments could be described generally as placing an antenna for a passive entry system into the cab interior of a vehicle. In this location, the antennas are able to search the entire possible area for the smart card with a single antenna. Moreover, both of the antennas are incorporated into an existing vehicle cab component. In this fashion, no additional structure is necessary.

A preferred embodiment of this invention has been disclosed, however, a worker in this art would recognize that certain modifications would come within the scope of this invention. For that reason, the following claims should be studied to determine the true scope and content of this invention.

What is claimed is:

1. A passive entry and ignition system for a vehicle comprising:

a vehicle user-carried smart card electronically coded with identifying data;

a seat positioned within a cab of said vehicle, and an antenna positioned in a seat bottom of said seat to scan for and receive said identifying data from said smart card;

a vehicle control that electronically responds to a signal from said antenna once a positive identification of said identifying data has been established, said vehicle control electronically enabling actuation of predetermined mechanical systems of said vehicle; and said seat bottom further includes an occupant detection mat including electronic components for identifying the weight of an occupant in said seat, and said antenna being incorporated into said mat.

* * * * *